United States Patent Office 3,381,665
Patented May 7, 1968

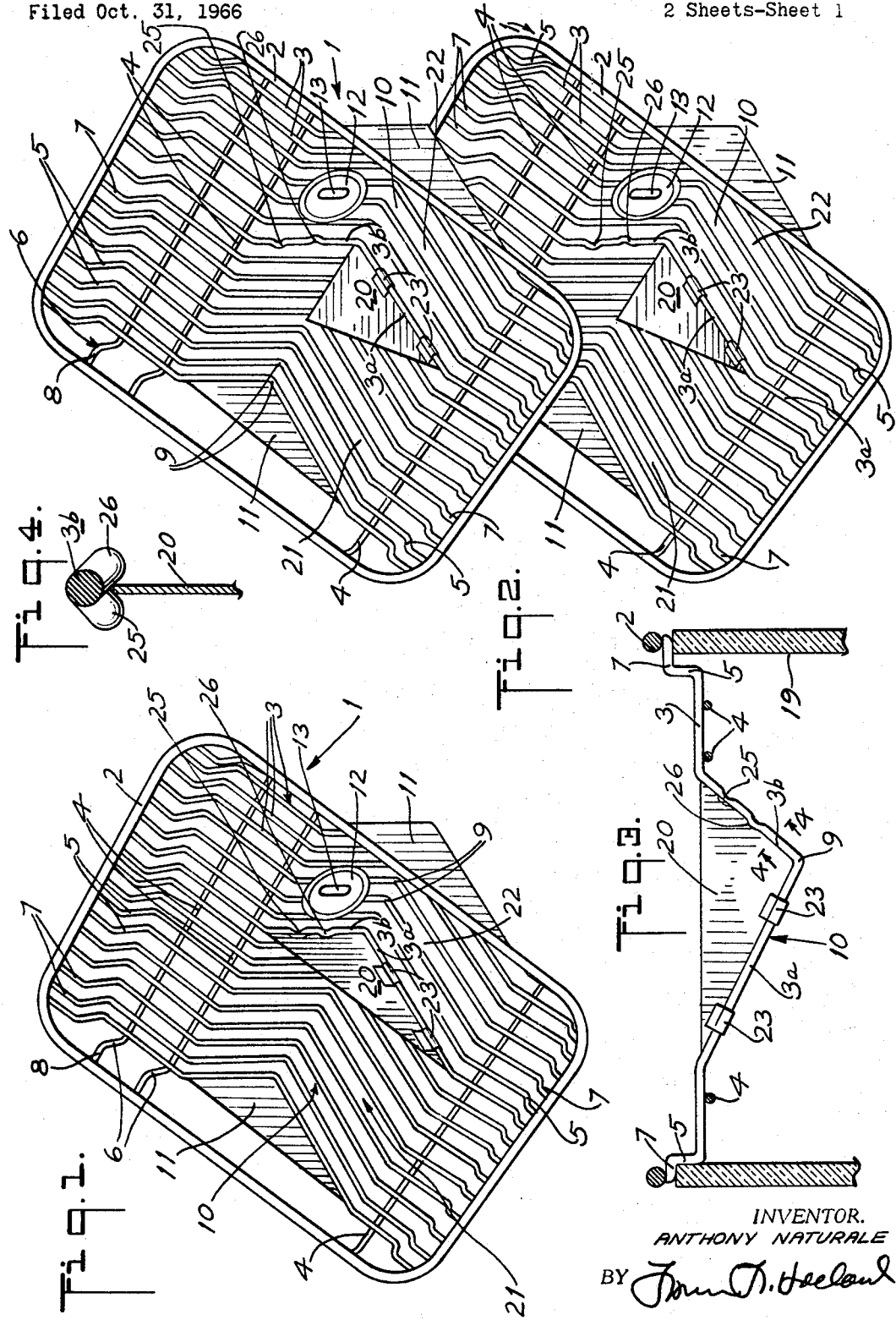

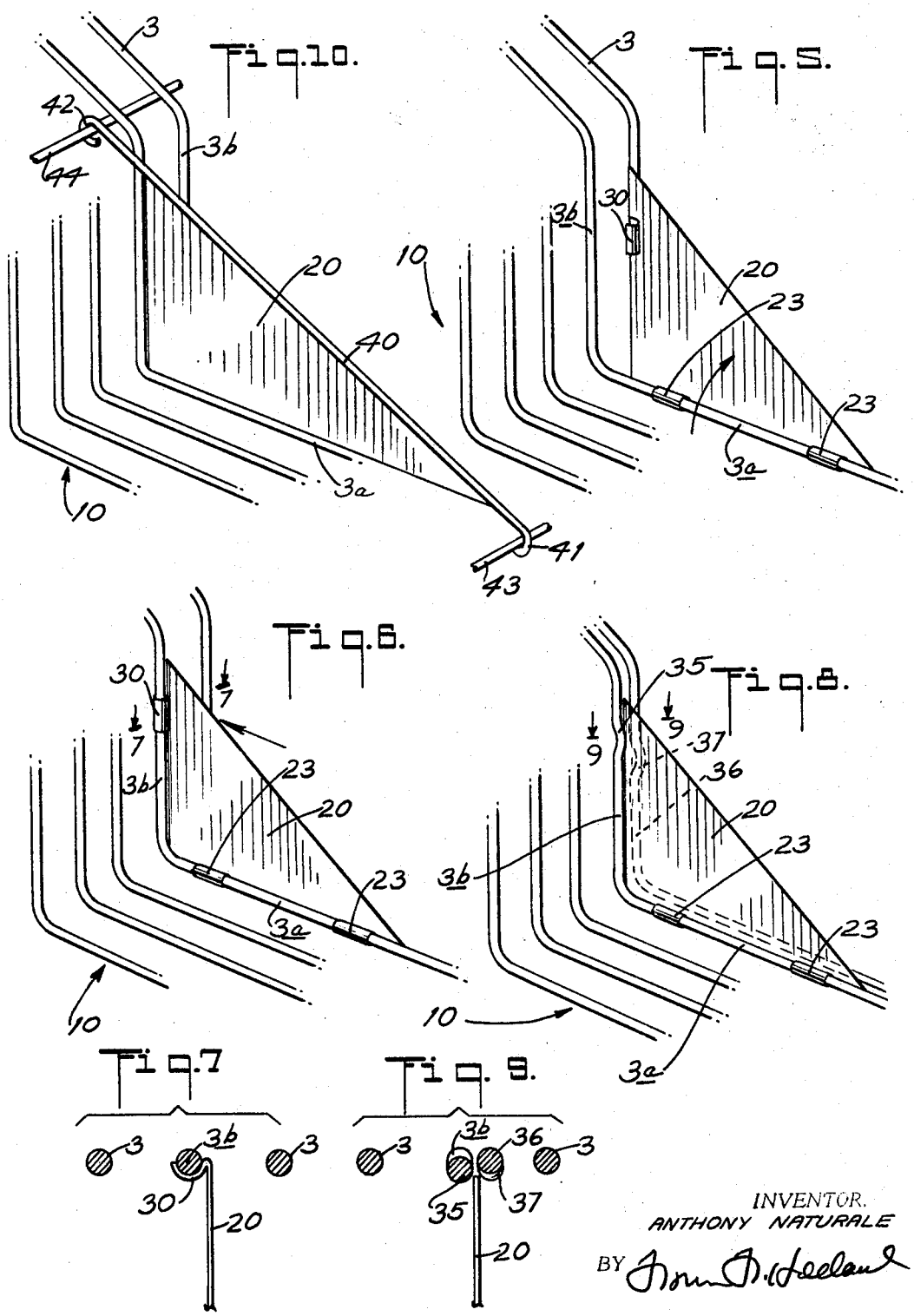

3,381,665
ANIMAL CAGE LID
Anthony Naturale, Roselle, N.J., assignor to Maryland Plastics Incorporated, New York, N.Y., a corporation of Maryland
Filed Oct. 31, 1966, Ser. No. 590,725
5 Claims. (Cl. 119—18)

ABSTRACT OF THE DISCLOSURE

The present invention is directed to an animal cage lid having a separator in the feed trough. The separator is pivotally mounted on a wire and is movable from an upright to a prone position. Means are provided on the wire for holding the separator in its upright position. Preferably, the wire comprises a pair of angled legs and the separator is pivotally mounted on one of the legs and the holding means are mounted on the other leg. The holding means preferably comprise a pair of knobs on said other legs which are spaced from each other and extend in opposite directions.

---

The present invention is directed to an animal cage lid and more particularly to an improved lid which may be stacked with others of its kind.

Heretofore animal cage lids of the type having a depressed feed trough portion have been fitted with a separator to form a bottle-receiving compartment and a feed-receiving compartment. Such a separator has been permanently fixed axially of the cage lid and has therefore prevented any provision for stacking during shipment and storage since the fixed separator prevents effective stacking.

The present invention overcomes this stacking problem by providing a separator which may be removed or folded out of the way to enable the lids to be stacked one within another without any obstruction from the separator member.

The present invention has for one of its objects the provision of an improved cage lid which is easily stackable.

Another object of the present invention is the provision of an improved cage lid in which the feed trough separator may be easily folded down.

Another object of the present invention is the provision of an improved cage lid in which the feed trough separator may be easily removed.

Another object of the present invention is the provision of an improved cage lid in which the feed trough separator may be easily placed in an upright position and maintained there.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 1 is a perspective view of an animal cage lid made in accordance with the preferred embodiment of the present invention;

FIG. 2 is a perspective view of the cage lids in position to be stacked on top of each other;

FIG. 3 is a sectional view showing the position of a lid on a cage;

FIG. 4 is a sectional view taken along line 4—4 of FIG. 3;

FIG. 5 is a perspective view of another embodiment of the present invention;

FIG. 6 is a perspective view showing the means of positioning the separator of FIG. 5 into operative relationship;

FIG. 7 is a sectional view taken along line 7—7 of FIG. 6;

FIG. 8 is a perspective view of another embodiment of the present invention;

FIG. 9 is a sectional view taken along line 9—9 of FIG. 8; and

FIG. 10 is a perspective view of still another embodiment of the present invention.

Referring particularly to the embodiment shown in FIGS. 1 to 4, the animal cage lid 1 comprises a thick outer rectangular wire frame 2 and a plurality of substantially parallel longitudinal thin wires 3. A plurality of thin transversely disposed reinforcing wires 4 are also provided forming a mesh. Both the reinforcing wires and the axial wires have step down portions 5 and 6 adjacent frame 2 which provide flanges 7 and 8 to permit the lid to be mounted on a cage 19 as shown in FIG. 3.

The longitudinal wires 3 have a substantially downwardly angled portion 9 to provide a feed trough 10. The sides of the feed trough 10 are closed off by a pair of side walls 11 and a plate 12 with an opening 13 provided in one wall of the trough 10 to permit the feed hose of a bottle (not shown) to extend therethrough.

A separator 20 is provided to separate the feed trough 10 into a solid food compartment 21 and a bottle holding compartment 22. The separator 20 is movable from an upright position to a prone folded position and in the embodiment shown in FIGS. 1 to 4, separator 20 is journalled on one leg 3a of the longitudinal wires 3 by means of hinges 23 so that it may swing down as shown in FIG. 2 and lie substantially flat against one wall of the feed trough 10. With the separator 20 in this position a plurality of cage lids may be stacked one on top of the other for storing and shipping purposes and since the separators 20 will not interfere with stacking, a saving of storage and shipping costs is obtained.

In order to maintain the separator 20 upright when in its operative position, the opposite leg 3b of the same longitudinal wire 3 has an inwardly extending crimp to form an upper knob 25 to one side of the wire leg 3b and another inwardly extending crimp to form a lower knob 26 below the first knob 25 to the other side of leg 3b. When the separator 20 is upright it will snap past knob 25 and be positioned between these knobs 25 and 26 and maintained in upstanding position.

In operation, when the separator 20 is to be used it is snapped into position between the two holding knobs 25 and 26 and when the separator 20 is to be moved to a flat position for shipping or storage purposes, it is snapped out from between the two knobs 25 and 26 and moved to a prone position as shown in FIG. 2.

FIGS. 5 to 7 show another embodiment of the present invention. In this embodiment the separator 20 is also hinged to the leg portion 3a of longitudinal wire 3 through journals 23. However a clamp 30 is mounted on the inner edge of the separator 20 in order to permit it to clamp the leg 3b of the longitudinal wire 3. The separator 20 is swung upwards and moved slightly toward the leg 3b when it is to be erected and when it is to be moved down, it is moved away from leg 3b and swung down.

FIGS. 8 and 9 show another embodiment of the present invention. The longitudinal wire 3 has a single knob 35 formed therein adapted to prevent the separator 20 from being moved down and an additional wire 36 is mounted adjacent to the leg 3a on the longitudinal wire 3 and having a knob 37 thereon, offset from the first knob 35. Hence, when the separator 20 is moved to its operative position it will snap past the first knob 35 and remain in its upright position by being held there in place between and by the two knobs 35 and 37.

FIG. 10 shows another embodiment of the present invention in which the separator 20 is mounted on a wire 40 having hooks 41 and 42 at each end adapted to cooperate with the reinforcing two cross wires 43 and 44, respectively. The hooks 41 and 42 are adapted to hold the separator 20 in place in the upright position. When the separator 20 is to be moved to its inoperative position the hooks 41 and 42 are adapted to be snapped off wires 43 and 44 and completely removed and laid flat on the floor of the feed trough 10. With this particular structure, the separator 20 may be located in upright position at any transverse point in order to permit the size of the feed compartment to be varied as desired.

It will be seen that the present invention provides an improved animal cage lid with a feed trough in which the separator member may be moved down into inoperative position so as to permit it and similar animal cage lids to be stacked on top of each other. This effects a savings in space and in shipping costs.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An animal cage lid having a top portion and a portion depressed below the level of said top portion to form a feed trough, said feed trough comprising a plurality of spaced longitudinal wires, a separator in said trough for separating it into two sections, said separator being pivotally mounted on one of said wires and being movable from an upright position to a prone position, and holding means on said one of said wires for holding said separator in its upright position.

2. An animal cage lid as claimed in claim 1, wherein said wire has a pair of legs and wherein said separator is pivotally mounted on one leg and said holding means are mounted on said other leg.

3. An animal cage lid as claimed in claim 2, wherein said holding means comprise a pair of knobs on said other leg.

4. An animal cage lid as claimed in claim 3, wherein said knobs are spaced from each other.

5. An animal cage lid as claimed in claim 4, wherein said knobs extend in diverse directions from each other.

References Cited

UNITED STATES PATENTS

| | | | |
|---|---|---|---|
| 1,157,045 | 10/1915 | Risher | 220—22 |
| 3,117,688 | 1/1964 | Walstad et al. | 217—7 |
| 3,117,692 | 1/1964 | Carpenter et al. | 220—60 |
| 3,256,859 | 6/1966 | Petit | 119—18 |

HUGH R. CHAMBLEE, *Primary Examiner.*